United States Patent
Edwards et al.

(10) Patent No.: US 6,873,834 B1
(45) Date of Patent: Mar. 29, 2005

(54) WIRELESS TERMINAL DIVERSITY SCHEME

(75) Inventors: Keith Russell Edwards, Hutton (GB); John McNicol, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/512,909

(22) Filed: Feb. 25, 2000

Related U.S. Application Data (63) Continuation-in-part of application No. 08/955,862, filed on Oct. 21, 1997, now abandoned.

(30) Foreign Application Priority Data

Dec. 20, 1996 (GB) ................................................ 9626549

(51) Int. Cl.[7] ................................................ H04B 1/06
(52) U.S. Cl. ................................ 455/277.1; 455/276.1; 455/277.2; 455/137
(58) Field of Search .......................... 455/276.1, 277.1, 455/277.2, 278.1, 137; 375/347, 349, 299

(56) References Cited

U.S. PATENT DOCUMENTS

| | | | | |
|---|---|---|---|---|
| 5,335,010 A | * | 8/1994 | Lindemeier et al. | 455/277.1 |
| 5,430,769 A | * | 7/1995 | Patsiokas et al. | |
| 5,461,646 A | * | 10/1995 | Anvari | |
| 5,526,398 A | * | 6/1996 | Okada et al. | |
| 5,533,011 A | * | 7/1996 | Dean et al. | |
| 5,740,204 A | * | 4/1998 | Nagashima | |
| 5,818,543 A | * | 10/1998 | Lee | 455/277.2 |
| 5,926,503 A | * | 7/1999 | Kelton et al. | |
| 6,009,307 A | * | 12/1999 | Granata et al. | |
| 6,018,651 A | * | 1/2000 | Bruckert et al. | 455/277.1 |

* cited by examiner

Primary Examiner—David Hudspeth
Assistant Examiner—Huy D Nguyen
(74) Attorney, Agent, or Firm—Barnes & Thornburg LLP

(57) ABSTRACT

The present invention relate to a wireless communication systems and in particular relates to a wireless diversity scheme. Diversity techniques are well established and known to help in many situations but have generally been considered too complex to implement in a low cost terminal. In accordance with a first aspect of the invention, there is provided a wireless terminal receiver arrangement which has a diverse receiver. Continuous signal assessment and fast switching enables only those signals which contribute to an improvement in the quality of the signal to be switched in.

31 Claims, 8 Drawing Sheets

FS=Fixed Station
BS=Base Station

FS=Fixed Station
BS=Base Station

Switch B

|  | 0 | 1 |
|---|---|---|
| Switch A  0 |  | B>A<br>B>T |
| 1 | A>B<br>A>T | A>T<br>B>T |

WIRELESS TERMINAL DIVERSITY SCHEME

RELATED APPLICATION

This application is a continuation-in-part of U.S. patent application Ser. No. 08/955,862, filed Oct. 21, 1997 now abandoned.

FIELD OF THE INVENTION

The present invention relate to wireless communication systems and in particular relates to a wireless terminal diversity scheme on the forward or downlink transmission.

BACKGROUND OF THE INVENTION

Presently, in typical mobile cellular radio networks both capacity (maximum number of users) and coverage (area covered from one base station site) tend to be limited by the system uplink (reverse link) performance. This is especially true where either uplink transmitter power is limited (by, inter alia, battery life considerations) or interference. Systems employing Code Division Multiple Access (CDMA) techniques with orthogonal downlink (forward link) and quasi orthogonal uplink are generally uplink capacity limited due to other user interference, when users are moving moderate speeds or faster. These CDMA systems employ powerful interleaving and coding to increase robustness against adverse channel conditions and other user interference. It is, therefore, usual to employ diversity techniques at the base station receiver (uplink) but not on the down link. With the advent of third generation (3G) wireless communications systems i.e. IMT 2000 family members comprising CDMA (both direct spread and multicarrier) and TDMA technology and with mobile data also carried over upgraded existing networks, it is anticipated that more capacity will be required in the downlink rather than the uplink (due to data asymmetry). Similar data symmetry issues will arise in fixed wireless access system terminals, although very much higher power transmitters in fixed access terminals is possible than compared with mobile hand portables (e.g. 2 watts compared with 200 milliwatts). Since fixed wireless access terminals are usually mains powered with a battery backup provided by larger electrical cells than would be viable to put into a handset or other portable terminal. Additionally-fixed wireless access terminals can be fitted with remote handsets or user interfaces and antennas positioned either externally or some distance from the users head/body.

Since fixed wireless access terminals are static or move infrequently, for example, between the rooms of a subscriber's residence, some of the techniques applied to mobile down links, such as interleaving, are relatively ineffective. In these cases down link capacity and coverage can potentially be the limiting factors in deployment. Diversity techniques are well established and known to help this situation but have generally been considered too complex to implement in a low cost terminal. U.S. Pat. No. 6,167,286 (Nortel Networks Limited) provides a diversity scheme for base stations with several antennas. This arrangement only processes the outputs from receive antennas which contribute to the overall carrier to raise ratio. This arrangement comprises phase rotators and continually monitors received power levels which results in a moderately complex system suitable for base stations having a large number of antennas.

OBJECT OF THE INVENTION

It is an object of the invention to provide a low cost and simple to implement radio link diversity arrangement for a wireless terminal.

STATEMENT OF THE INVENTION

In accordance with a first aspect of the invention, there is provided a wireless subscriber terminal comprising a diversity antenna arrangement and a receive path including signal assessment means, a combiner, switches and control means; wherein, in operation, receive signals are switched in and out of the received path to provide a test combination of received diversity signals for a finite period on a fast switching basis; wherein, subsequent to an initial selection of receive diversity signals, improvement for a test combination of receive diversity signals is determined by incremental signal quality; wherein, upon determination of an incremental signal quality for said test combination of receive diversity signals are switched into the receive path and under the control of the control means.

Since phase is neither measured nor accounted for, the present invention provides a random search technique and improvement is achieved by selecting antennas to make improvements in bit error rate compared with a non-diverse terminal.

Preferably, the antennas of the system are separated by distance, whereby spatial diversity is employed to differentiate signals. Alternatively, the antennas of the system have a different polarisation, whereby polarisation diversity is employed to differentiate signals. The system could incorporate both spatial and polarisation diversity. A rake receiver is conveniently employed to combine signals which are spatially separated, alternatively, other optimal detection methods could be employed. The delay, T is set to a period corresponding to a chip period to minimise the possibility of creating a broadband null in the reception pattern under low multipath conditions.

In accordance with a still further aspect of the invention, there is provided a wireless subscriber terminal comprising the receiver diversity arrangement.

In accordance with a further aspect of the invention, there is provided a method of operating a wireless subscriber terminal comprising a diversity antenna arrangement and a receive path including signal assessment means, a combiner, switches and control means; wherein diverse signals are received from the antenna arrangement are switched in and out of the receive path to provide a test combination of receive diversity signals for a finer period on a fast switching basis; wherein, upon determination of an increment signal quality for said test combination of receive diversity signals, relative to a previous signal quality, said test combination receive diversity signals are switched into the receive path under the control of the control means; wherein, upon determination of no variants in signal quality relative to a previous signal quality, and the prior combination of receive diversity signals are maintained.

BRIEF DESCRIPTION OF THE FIGURES

In order to allow a greater understanding of the invention, reference shall now be made to the Figures, wherein.

DETAILED DESCRIPTION OF THE INVENTION

Embodiments of the present invention are described below by way of example only. These examples represent the best ways of putting the invention into effect that are presently known to the applicant although they are not the only ways in which this could be actioned.

Figure 1:
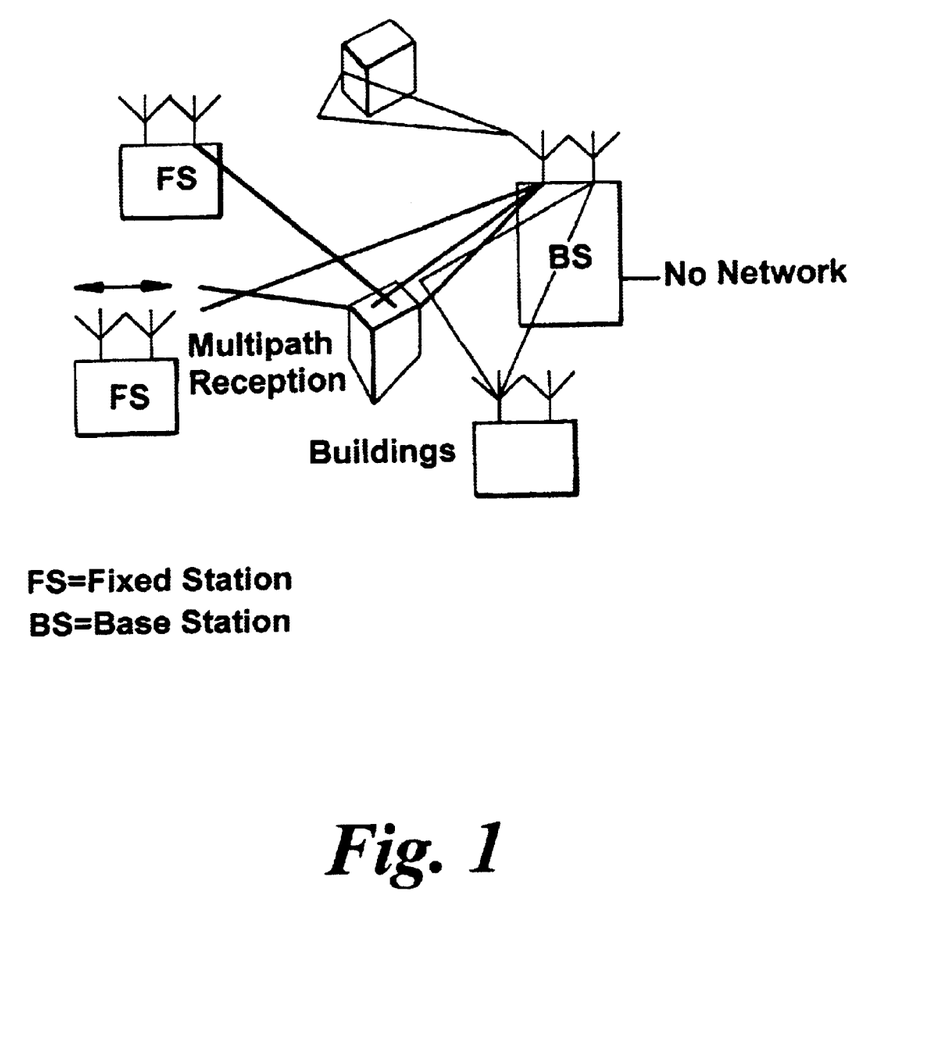
FIG. 1 shows a typical multi-path, fixed wireless scenario.

Referring now to FIG. 1, a typical deployment of a multi-path signal environment fixed wireless system, wherein an subscriber station having a single antenna could remain in a signal null for long periods of time. In this case, because of the existence of a multi-path environment, the reception of the down link orthogonality has been compromised to a "quasi orthogonal" situation.

The maximum capacity of the system, Nu, will then be approximated by:
In the uplink, $$Nu \approx \frac{W/R}{Eb/No}$$

and;
in the forward link $$Nu \approx \frac{W/R}{\alpha Eb/No}$$

or maximum number of codes, (down link), whichever is lower
where
W=Spread Bandwidth (chip rate)
R=Data rate
Eb/No=Bit energy spectral density
α=Orthogonality factor (range: 0–1)
For quasi orthogonality α=1;
for perfect orthogonality α=0.

Generally the uplink bit energy spectral density (Eb/No) required for converting operation will be lower than the down link for the same bit error rate (BER) in the static environment for a typical CDMA system. Thus when orthogonality has been compromised it is essential to reduce the bit energy spectral density required on the downlink.

Figure 2:
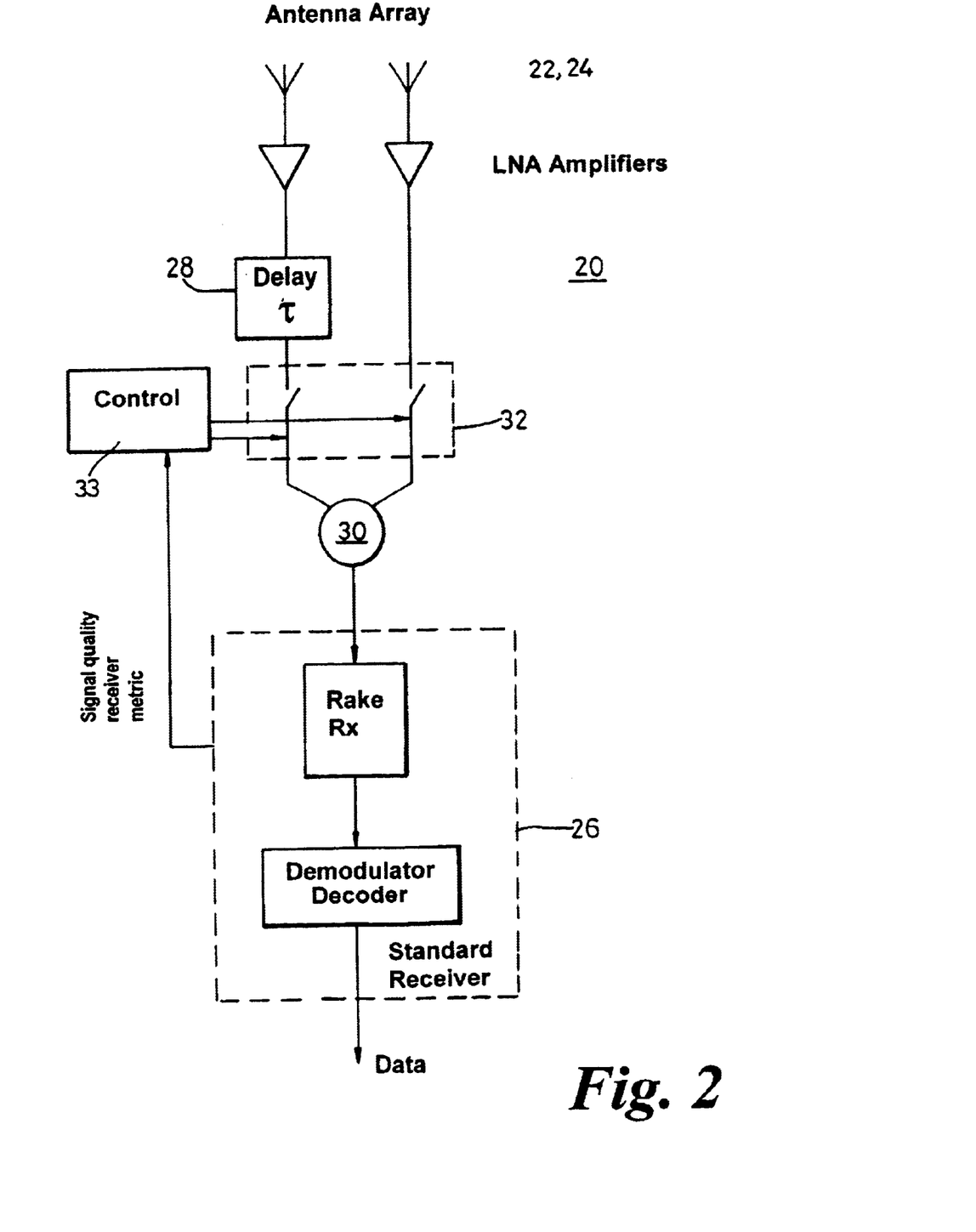
FIG. 2 shows a first embodiment of the invention.

A first embodiment of the invention is shown in FIG. 2 and provides a simple to implement downlink diversity scheme. The arrangement 20 comprises two antennas, 22, 24. Each antenna receives a different signal due to the multi-path environment. These signals are then amplified by low noise amplifiers 24 to provide a low noise front end to the receiver, 26. One signal is time delayed by optional delay means 28 by a period τ, where τ is the chip rate or the inverse of the Spread bandwidth which signals, are switched at as appropriate, to a two-way power combiner, 30, the operation of which is controlled by control means 34. A filter (not shown) is provided to filter out adjacent channel interference. The combiner scheme conveniently employs RAKE receivers and makes use of the ability of RAKE receivers to combine two time delayed multi-paths in an optimal manner. Other arrangements operable to provide a signal metric are possible instead of the RAKE receiver.

FIG. 2 does not show band pass filters, A/D converters and FIR filters between the combiner and receiver, as would be known to those skilled in the art.

Figure 2A:
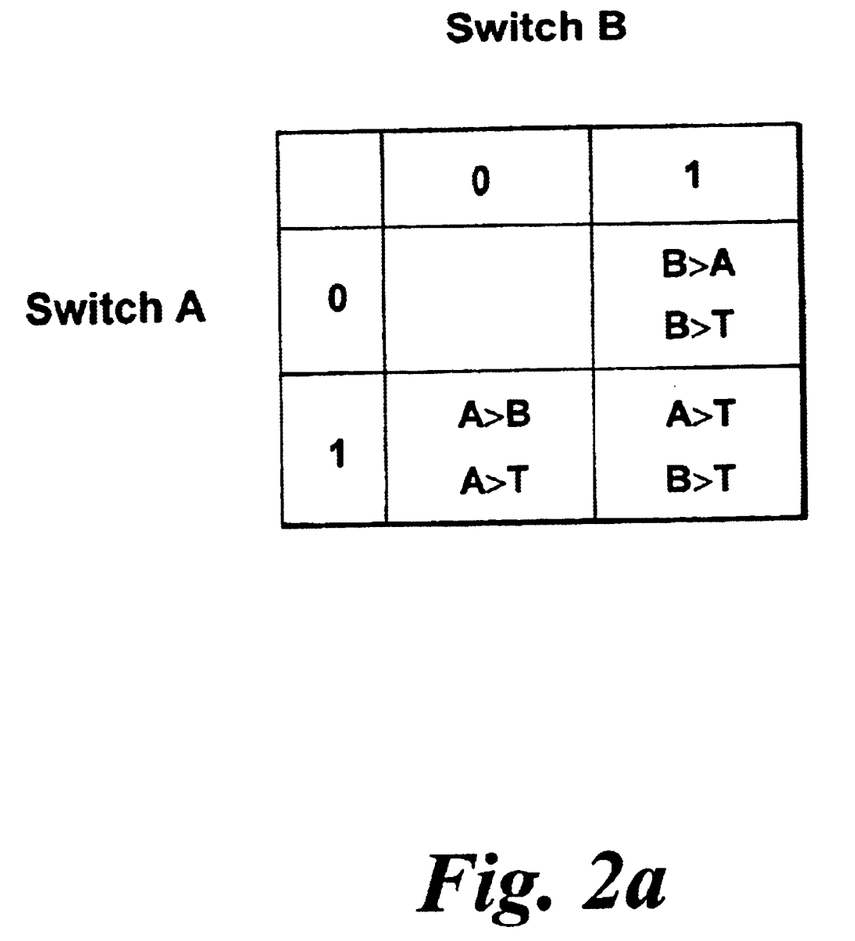
FIG. 2a shows a switch arrangement.

FIG. 2a shows a switch state arrangement: inputs from both switches A and B may be selected independently or together relative to their respective signal strengths and the level of threshold, T. At the combiner, the signal strength on both antennas is measured by the signal strength measurement devices and the switch corresponding to the strongest input selected. The switch on the other antenna is selected if, when the signal from the other antenna is added to the signal of the first antenna, the overall signal strength (carrier to noise) would increase. The switching is continuous and rapid. As is known, rapid switching is said to occur when switching occurs within frames, in contrast to slow switching, which occurs on a frame-by-frame basis or over a longer period. This is possible because the system employs interleaving and an error correcting code(s) to recover bit errors which may occur due to variations within a frame for users with high mobility. A method similar to a combiner algorithm could be employed, such as the algorithm disclosed in U.S. Pat. No. 5,842,361 (Nortel Networks Corporation), wherein only signals which contribute to the overall signal-to-noise ratio are utilised. The invention takes advantage of the fact that, in a fixed wireless access scheme or where users are limited to slow speed by the nature of the application or other factors fades occur less frequently and last over a longer time frame than compared with mobile wireless schemes where subscribers are not restricted in mobility and tend to be fast moving.

The addition of the switch and control elements improves the combiner performance over that of the simple combiner by avoiding the case where one antenna being in a power null would cause up to 3 dB loss in sensitivity. By reducing the required bit energy spectral density using diversity both coverage and capacity are improved.

Figure 2B:
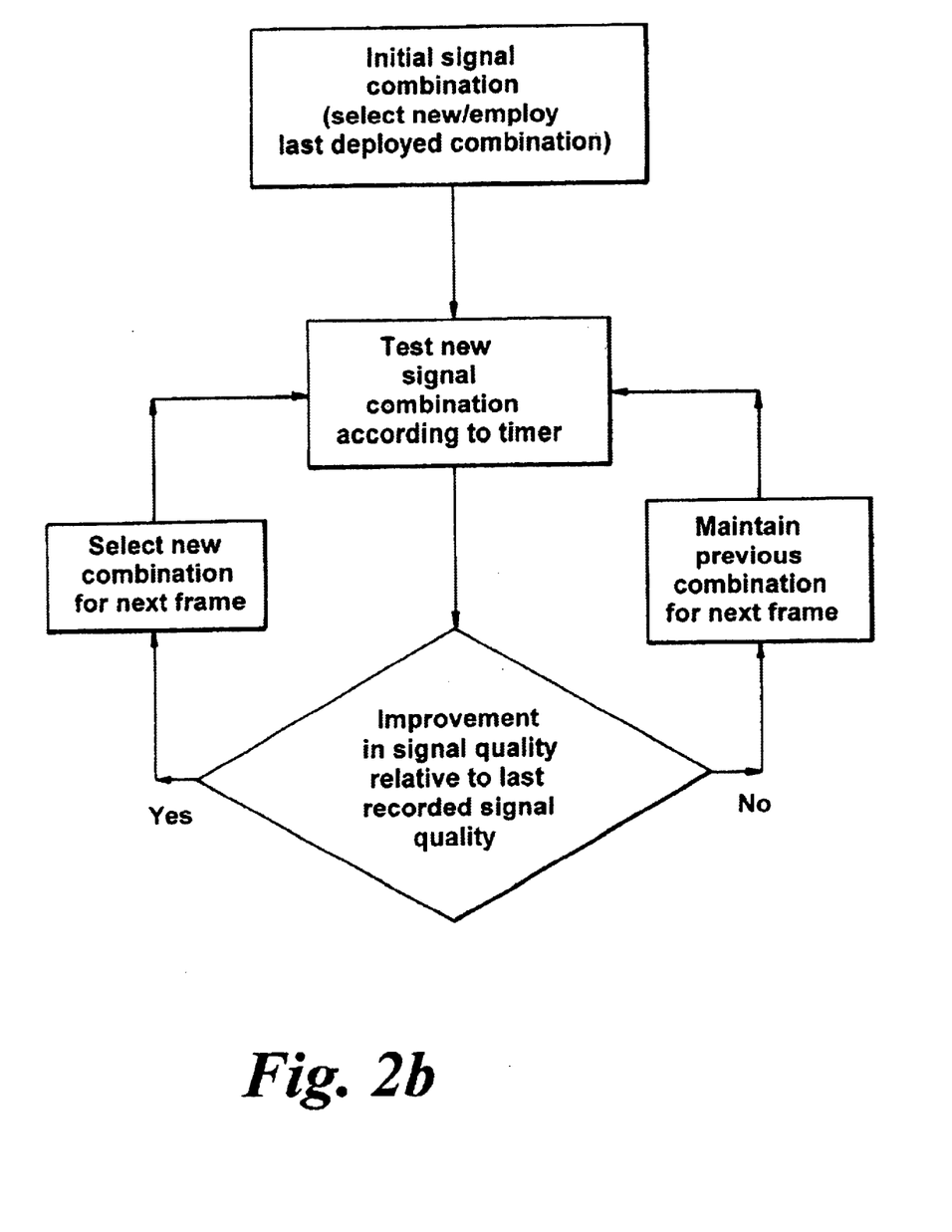
FIG. 2b shows a flow chart depicting operation of the invention.

Referring now to FIG. 2b there is shown a flowchart detailing one possible method of controlling the switching of the input signal combinations. At the start up, a new (either random or predetermined) selection of switches is selected. The signal is then passed to a delay and test unit wherein a new test signal combination is tested for a fraction of a frame (typically a quarter of a frame): the signal quality is determined: if there is an incremental improvement in the signal quality then the new signal combination is selected: if there is no incremental improvement in signal quality then the new signal combination is not selected. After each decision to maintain or select a particular input signal combination, there is a delay, the period of delay being determined by the fast switching speed, typically being of the order of one frame.

Figure 2C:
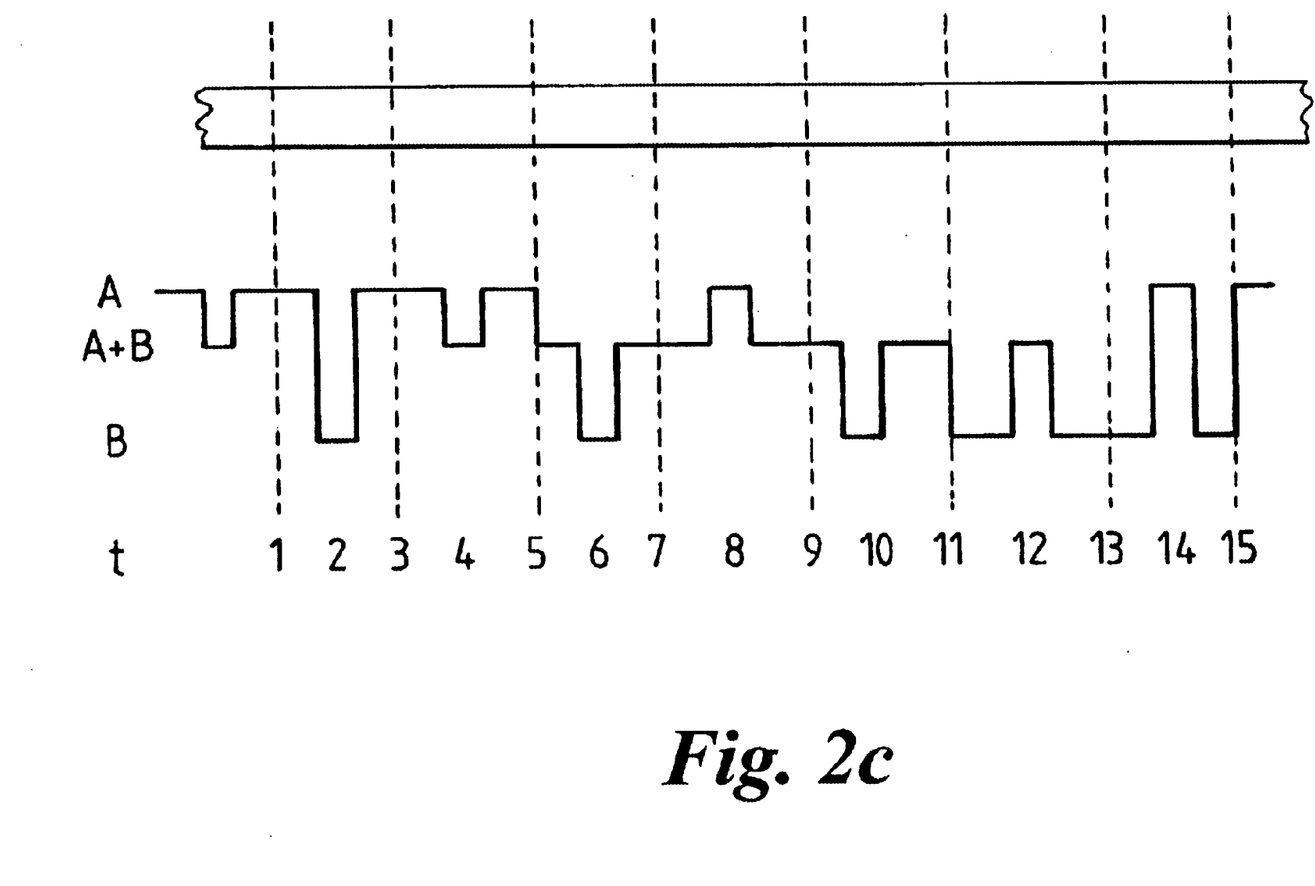
FIG. 2c shows a CDMA timing sequence.

Referring now to FIG. 2c, a series of CDMA frames are shown for a receiver having two receive inputs, A and B, which may be used singularly or in combination. Input A only was selected prior to time t=1; A plus B was test sampled for a "look through" in the frame proceeding the first CDMA frame shown. At t=2 a test sample is sampled but does not improve output and so is not selected and accordingly no change is effected at t=3, which corresponds to the end of the first frame shown in the diagram. During the second frame shown in the Figure, a sample is made at t=4 A plus B. The signal quality is improved and accordingly at t=5 both A and B signals are adopted for the receive path. At t=6 a test is made of received path B, but no signal improvement is apparent and no change to receiver is made at t=7. Similar results occur when a test is made of receive path A at t=8. Nevertheless at t=10 receive path B provides an improvement over the signal and at t=11, the receive path B is adopted. At t=12, A plus B is tested but does not provide an improvement. At t=14, A is tested, which provides an improvement and is adopted at t=15.

In a preferred case, where deployment provides low multipath delay spread, a means 36 for evaluating the degree of mufti-path (delay spread metric for RAKE) in the environment could be used to disable the selection of the second antenna in the case that orthogonality on the downlink has not been compromised by the channel. If this control was not present the diversity arrangement would compromise orthogonality by adding a multi-path equal in strength to the first path one chip away. This would turn perfect orthogonality ($\alpha=0$) into compromised orthogonality ($\alpha=0.5$). In practice, however, this is unlikely to be a drawback in deployment. It is expected that only very few links will have very good orthogonality and the majority will benefit by reduction in Eb/No by more than the any small increase in a introduced by the simplest embodiment.

The range can be increased directly by the lower bit energy spectral density for dB and capacity can be increased by the reciprocal of the bit energy spectral density in linear terms. That is, a 3 dB halving of bit energy spectral density increases capacity by up to a factor of 2. By switching only when the second antenna directly contributes to the carrier to noise ratio there is no or little reduction in the signal strength, that is normally associated with this type of diversity when one antenna is in a power null.

Figure 3:
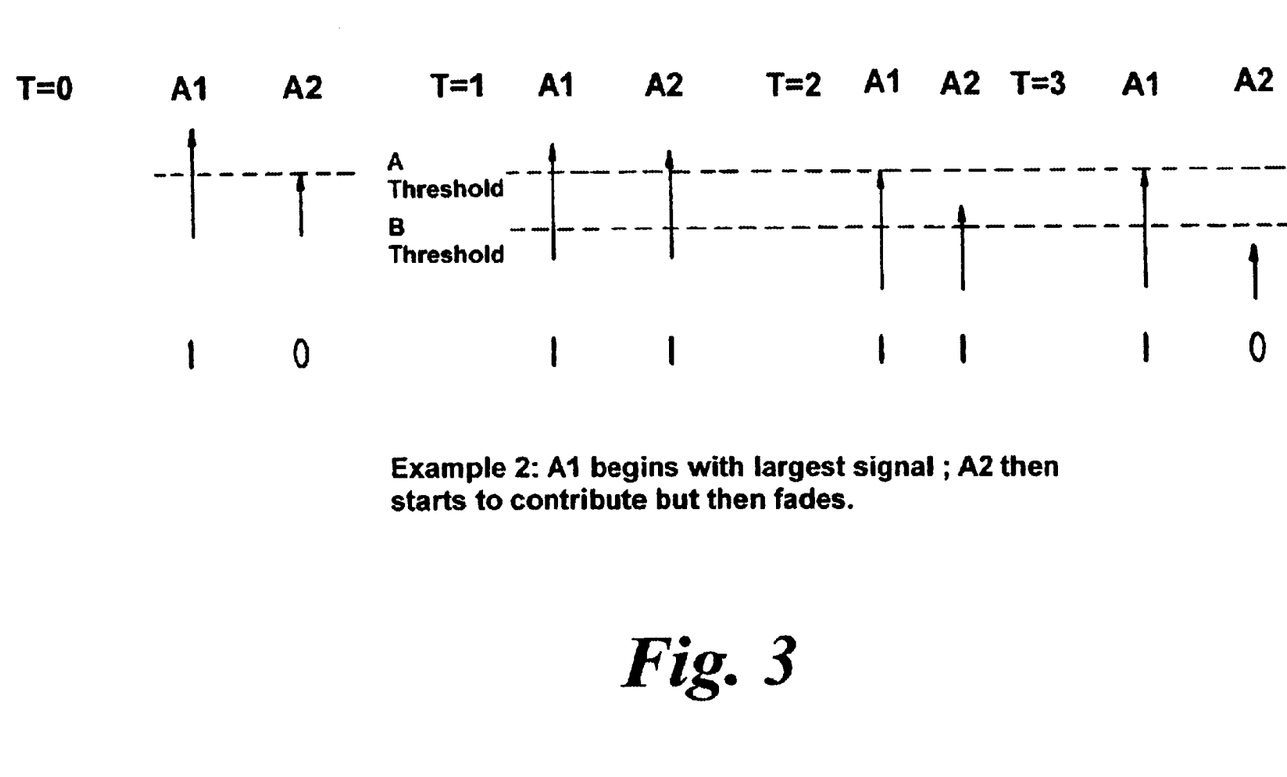
FIG. 3 shows a first scenario of operation.

Since the fixed channel is generally varying at a slower rate than is encountered in mobile radio situations, the RAKE is not presented with switching transients that would otherwise be present. It is to be noted that if the arrangement includes a simple switch diversity scheme alone, step changes in the RAKE input would be produced, which would be highly undesirable. In such a case, the operation would be similar to the case depicted in Example 1 (FIG. 3): A1 begins off largest and then fades whereas A2 begins at an insignificant level and becomes the dominant signal. So at T=0 only A1 is selected. As A2 increases at T=1 it is also selected and both remain selected for T=2 and T=3. Finally at T=4, A1 no longer contributes to C/N and is deselected and only A2 selected.

Figure 4:
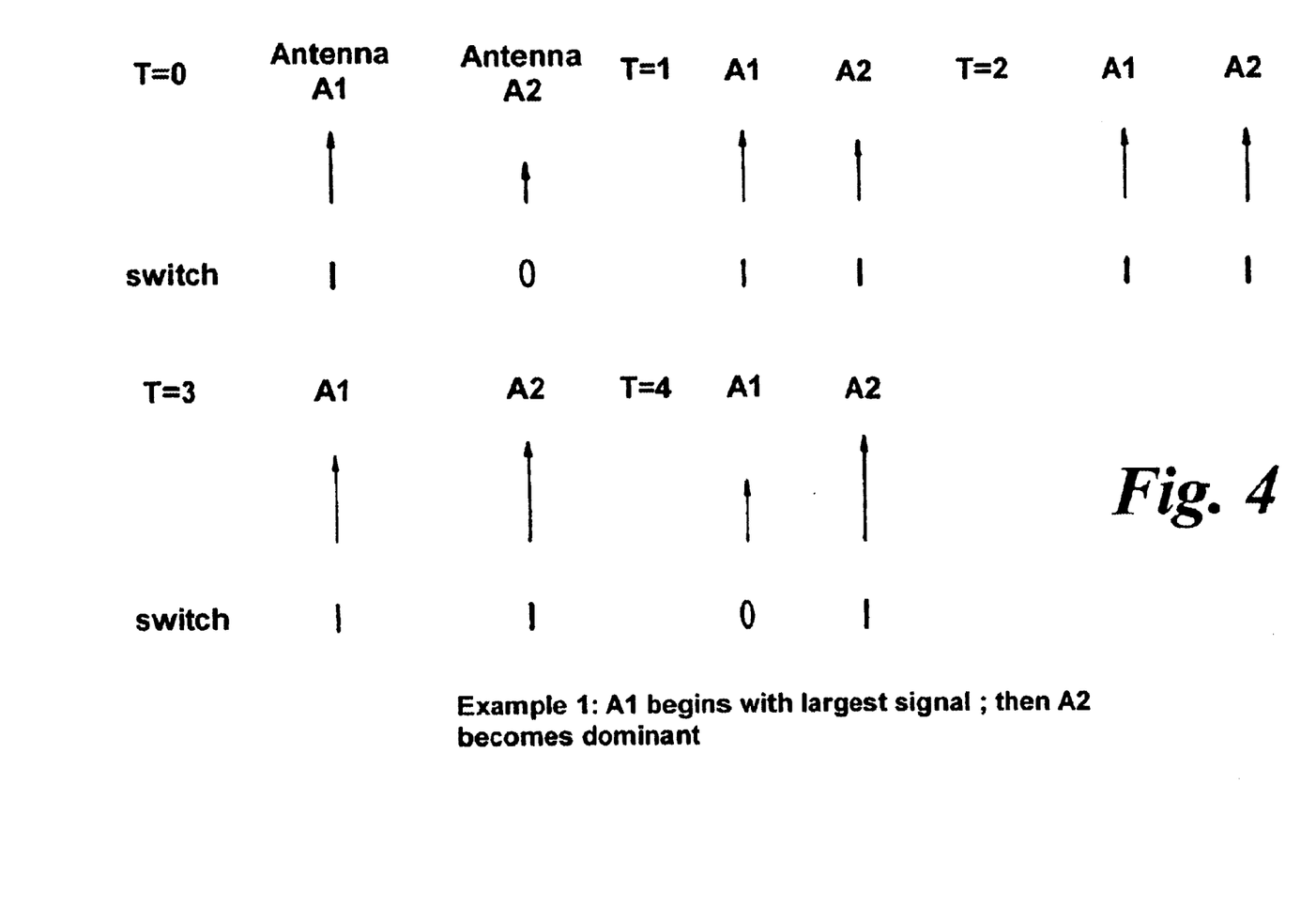
FIG. 4 shows a second scenario of operation employing a threshold detector.

In the second example, shown in Example 2 (FIG. 4), two levels of threshold are used to provide hysteresis to the process. This could also be applied in the case of the first example to reduce the impact of change on the RAKE receiver if it was found that two or more signals were present that caused frequent switching. Depending upon RAKE performance a threshold could be chosen to optimise overall performance.

Figure 5:
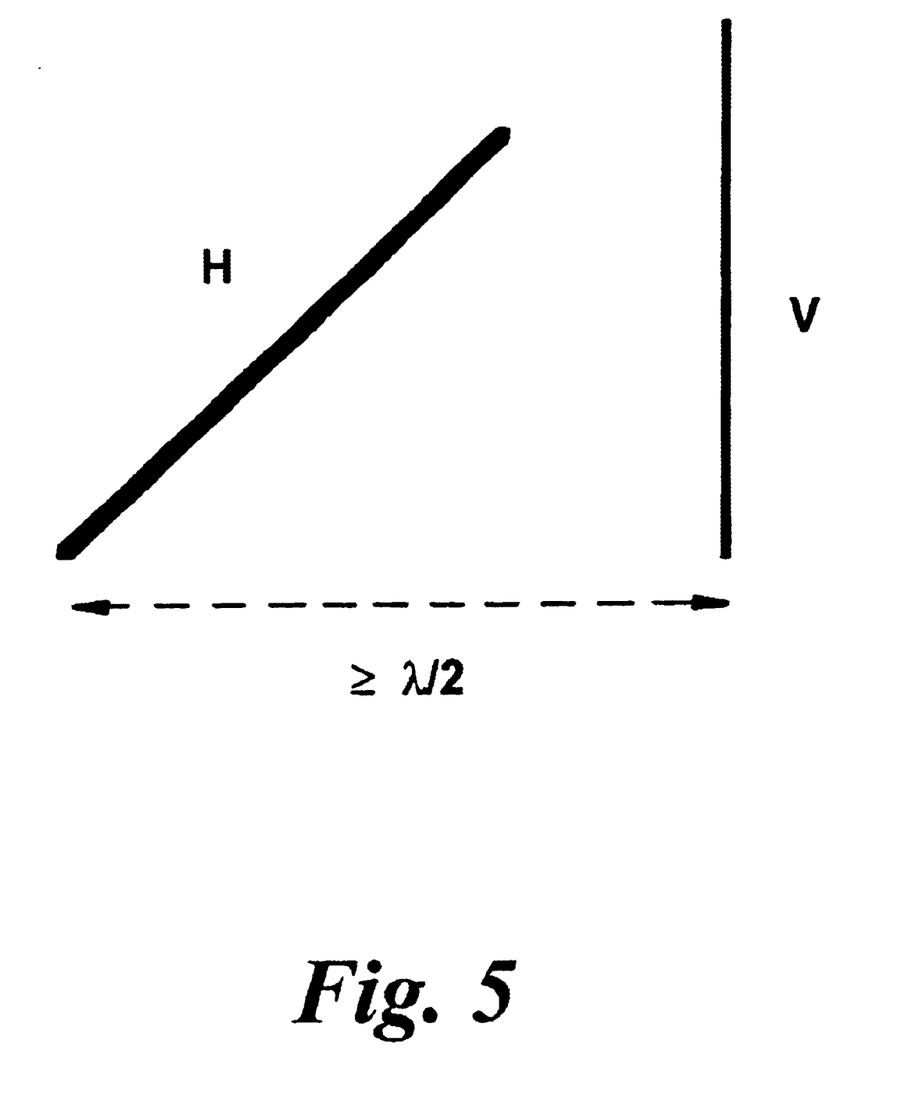
FIG. 5 shows a possible form of an antenna arrangement to provide receive diversity.

FIG. 5 shows a possible antenna set-up where the orientation of vertical and horizontal antennas is such that space and polarisation diversity techniques can be employed. Other spatial and angular orientations are possible.

The switch mechanism is preferably provided with a dual d.c and FIR filter in order to attenuate adjacent channel interference before signals are detected by the level detector. It would also be possible to switch blindly from one antenna to another, provided the switch was made sufficiently quickly to avoid frame error whereby to measure receive level at each antenna.

What is claimed is:

1. A receiver arrangement for a wireless terminal, for receiving a broadband signal the arrangement comprising:
   a plurality of antennas forming a diversity antenna arrangement;
   a plurality of receive paths, each receive path associated with one of said antennas;
   a delay element in at least one of said receive paths;
   a plurality of switches, each switch associated with one of said receive paths;
   a combiner, arranged to combine the output of said plurality of switches into a combined signal;
   a signal assessor, arranged to assess said combined signal according to a predetermined metric; and
   a controller, arranged to selectively switch at least one antenna into its receive path and to determine dependent on said assessment whether to change said antenna selection or to maintain said antenna selection for a predetermined period.

2. A receiver arrangement as claimed in claim 1, wherein said predetermined metric is a received signal quality metric.

3. A receiver arrangement as claimed in claim 1, wherein each of the receive paths except for one is provided with a delay element arranged to time delay signals received by the antenna associated with said receive path.

4. A receiver arrangement according to claim 3, wherein each delay element is operable to delay the signals with respect to each other by a period $\tau$, corresponding to the chip rate of a spread spectrum transmission scheme in accordance with which said signals are provided.

5. A receiver arrangement according to claim 4 wherein MLSE demodulation techniques are employed.

6. A receiver arrangement as claimed in claim 1, wherein the controller switches signals into the receive path and signals currently in the receive path but of the receive path.

7. A receiver arrangement as claimed in claim 1, wherein the receiver arrangement uses a code division multiple access technique.

8. A receiver arrangement according to claim 1 wherein the signal assessor is arranged to assess the carrier to noise power ratio of received signals.

9. A receiver arrangement according to claim 1 wherein the plurality of antennas are separated by distance, whereby spatial diversity is employed to differentiate signals.

10. A receiver arrangement according to claim 1 wherein the plurality of antennas have a different polarization, whereby polarization diversity is employed to differentiate signals.

11. A receiver arrangement according to claim 1 wherein the plurality of antennas support both spatial and polarization diversity.

12. A receiver arrangement according to claim 1, wherein hysteresis is employed to control the switching.

13. A receiver arrangement according to claim 1, further comprising a rake receiver arranged to combine signals.

14. A receiver arrangement according to claim 1, wherein the predetermined metric comprises a multi-path metric which can be set so that only one of said plurality of antenna is employed.

15. A wireless access subscriber equipment including a receiver arrangement as described in claim 1.

16. A receiver arrangement according to claim 1 wherein the receiver arrangement is a fixed wireless subscriber terminal.

17. A receiver arrangement according to claim 1, wherein the receiver arrangement is a mobile wireless subscriber terminal.

18. A receiver arrangement according to claim 1, wherein the combiner, the plurality of switches and controller are arranged to perform switching of received diversity signals at predetermined time intervals which are equivalent to a fraction of a frame of said received diversity signals.

19. A method of operating a receiver arrangement in a wireless terminal comprising a plurality of antennas forming a diversity antenna arrangement, the method comprising:
   receiving broadband signals along at least one of a plurality of receive paths, each receive path associated with an antenna and each having a switch and at least one of said receive paths having a delay element;

selecting at least one received signals using said switches;

combining the outputs of said switches into a combined signal;

assessing said combined signal according to a predetermined metric; and dependent on said assessment, deciding whether to change said signal selection or to maintain said signal selection for a predetermined period.

20. A method as claimed in claim 19, wherein the selecting step switches signals into the receive path and signals currently in the receive path out of the receive path.

21. A method as claimed in claim 19, wherein the receiver arrangement uses a code division multiple access technique.

22. A method according to claim 19, wherein the signals are selected only when such signals contribute to the carrier to noise ratio.

23. A method according to claim 19, wherein the plurality of antennas are separated by distance, whereby spatial diversity is employed to differentiate signals.

24. A method according to claim 19 wherein the plurality of antennas are arranged to have a different polarization, whereby polarization diversity is employed to differentiate signals.

25. A method according to claim 19 wherein the plurality of antennas are arranged to support both spatial and polarization diversity.

26. A method according to claim 19, wherein hysteresis is employed to control the switching.

27. A method according to claim 19, wherein the receiver further comprises a rake receiver arranged to combine signals.

28. A method according to claim 19, wherein the receive paths comprise at least two diverse receive paths and wherein each receive path except for one has a delay element operable to delay the signals with respect to each other by a period τ, corresponding to the chip rate of a spread spectrum transmission scheme in accordance with which said signals are provided.

29. A method according to claim 28 further comprising the step of:

demodulating said combined signal using MLSE techniques.

30. A method according to claim 19, wherein the predetermined metric comprises a multi-path metric.

31. A method according to claim 19, wherein the predetermined metric is a received signal quality metric.

* * * * *